United States Patent
Schleicher et al.

(10) Patent No.: US 8,507,391 B2
(45) Date of Patent: Aug. 13, 2013

(54) ELASTIC ARTICLES, PARTICULARLY DRIVE BELTS, HAVING A TEXTILE OVERLAY AND A BONDING AGENT MADE FROM MELTABLE PLASTIC

(75) Inventors: Marko Schleicher, Seelze (DE); Henning Kanzow, Hannovor (DE); Claus-Lueder Mahnken, Ahausen (DE); Siegmar Gebhardt, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 0 days.

(21) Appl. No.: 13/157,463

(22) Filed: Jun. 10, 2011

(65) Prior Publication Data

US 2011/0269589 A1 Nov. 3, 2011

Related U.S. Application Data

(63) Continuation of application No. PCT/EP2009/064257, filed on Oct. 29, 2009.

(30) Foreign Application Priority Data

Dec. 10, 2008 (DE) .......................... 10 2008 055 497

(51) Int. Cl.
*B32B 5/04* (2006.01)
(52) U.S. Cl.
USPC ........... 442/182; 442/183; 442/293; 442/328; 442/399
(58) Field of Classification Search
USPC ................ 442/327, 304, 181, 182, 183, 293, 442/328, 399
See application file for complete search history.

(56) References Cited

U.S. PATENT DOCUMENTS

| | | |
|---|---|---|
| 3,981,206 A | 9/1976 | Miranti, Jr. et al. |
| 4,096,764 A | 6/1978 | Richmond et al. |

(Continued)

FOREIGN PATENT DOCUMENTS

| | | |
|---|---|---|
| DE | 38 23 157 A1 | 2/1990 |
| DE | 102006025562 A1 * | 12/2007 |

(Continued)

OTHER PUBLICATIONS

International Search Report dated Feb. 5, 2010 of international application PCT/EP 2009/064257 on which this application is based.

*Primary Examiner* — Elizabeth Cole
(74) *Attorney, Agent, or Firm* — Walter Ottesen, P.A.

(57) ABSTRACT

An article has an elastic main element based on a vulcanizate having a wear-susceptible article surface. The article is primarily a drive belt (8) having a top layer (9) as the belt rear and a substructure (10) having a force transmission zone (13), wherein the force transmission zone and/or the top layer is/are supplied with a textile overlay (15), wherein the textile overlay is in turn additionally prepared with a plastic. The plastic is a bonding agent that is arranged between the main body and the textile overlay (15), wherein the plastic is supplied such that it melts during vulcanization and penetrates into the textile overlay while bonding, connected to a permanent adhesive bond between main body and textile overlay. A cotton fabric is used as the textile overlay (15), for example. The plastic is in the form of a film, for example, particularly in the form of a PE film. The primary purpose of use is the V-belt, ribbed V-belt (8) and the toothed belt.

34 Claims, 1 Drawing Sheet

(56) References Cited

U.S. PATENT DOCUMENTS

| | | | |
|---|---|---|---|
| 5,417,618 A | 5/1995 | Osako et al. | |
| 6,770,004 B1 | 8/2004 | Lofgren et al. | |
| 7,749,118 B2 | 7/2010 | Baldovino et al. | |
| 2004/0048708 A1 * | 3/2004 | Nonnast et al. | 474/260 |
| 2006/0063627 A1 | 3/2006 | Tomobuchi | |
| 2007/0191163 A1 | 8/2007 | Kanzow et al. | |
| 2008/0032837 A1 | 2/2008 | Unruh et al. | |
| 2008/0261739 A1 | 10/2008 | Kanzow et al. | |
| 2010/0240482 A1 | 9/2010 | Kanzow et al. | |

FOREIGN PATENT DOCUMENTS

| | | |
|---|---|---|
| DE | 10 2008 012 044 A1 | 9/2009 |
| EP | 1 830 102 A1 | 9/2007 |
| GB | 2 292 339 A | 2/1996 |
| WO | WO 9602584 A1 | 2/1996 |

* cited by examiner

ELASTIC ARTICLES, PARTICULARLY DRIVE BELTS, HAVING A TEXTILE OVERLAY AND A BONDING AGENT MADE FROM MELTABLE PLASTIC

CROSS REFERENCE TO RELATED APPLICATIONS

This application is a continuation application of international patent application PCT/EP 2009/064257, filed Oct. 29, 2009, designating the United States and claiming priority from German application 10 2008 055 497.9, filed Dec. 10, 2008, and the entire content of both applications is incorporated herein by reference.

FIELD OF THE INVENTION

This invention relates to an article having an elastic foundational body based on a vulcanizate having a wear-susceptible article surface which is provided with a textile cover ply, wherein, in turn, the textile cover ply is additionally provided with a polymer regionally at least. The elastic foundational body is usually additionally provided with an embedded strength element or tensile element, which may be embodied with one or more plies.

BACKGROUND OF THE INVENTION

An article exposed to the dynamic stresses and thus also to wear as well as noise development is, for example, a band, belt, strap, hose, air spring lobe, compensator or multilayered web, of which the belt in the form of a drive belt is of particular relevance. The elastic foundational body of the drive belt comprises a top ply as belt backing and a substructure with a force transmission zone. For this, reference is made particularly to the following patent literature: DE 38 23 157 A1, United States patent application publication 2008/0261739, United States patent application publication 2007/0191163, WO 96/02584 A1, U.S. Pat. No. 7,749,118, United States patent application publication 2008/0032837, U.S. Pat. No. 3,981,206 and U.S. Pat. No. 5,417,618.

Drive belts in particular are coated with a coating in the region of the force transmission zone in particular for noise reduction and also enhanced abrasion resistance. The prior art in this respect is:

Use is made of a flocked cover ply, particularly in the form of a cotton or aramid flock, or of a thin elastic polymeric layer filled with fibers (aramid fibers for example), for example, as described in unexamined application DE 38 23 157 A1, wherein the flocked cover ply is usually attached by means of a solution. However, this coating is not durable with some engines. Moreover, noise problems occur with some engines in the case of moisture.

A loop-drawingly knitted textile cover ply, for example as described in U.S. Pat. No. 3,981,206, is used. The disadvantage here is that noise emerges in test engines in the presence of moisture.

A textile cover ply in the form of a formed-loop knit fabric is used. United States patent application publication 2008/0261739 in particular is cited in this regard. The warp-knit fabric consists of a first yarn, more particularly composed of a polyamide (PA) or polyester (PES), and of a second yarn, more particularly composed of a polyurethane (PU). Again the disadvantage is that test engines give rise to noise in the presence of moisture.

The textile cover ply is a nylon-6,6 stretch fabric and is used particularly in toothed belts, for which in particular United States patent application publication 2007/0191163 must be cited. However, a nylon-6,6 stretch fabric is relatively costly.

U.S. Pat. No. 7,749,118 describes a toothed belt, the top ply and force transmission zone of which is endowed with a textile cover ply, wherein the textile cover ply is in turn endowed with an oil-resistant polymer. The polymer used is a fluoropolymer (PTFE for example).

Some PU belts utilize a textile cover ply comprising a woven fabric, of nylon-6,6 in particular, where a self-supporting film, of polyethylene for example, is applied to the woven fabric cover ply from the outside. However, the self-supporting film is a processing aid. It stops the liquid PU from flowing through the woven fabric as the teeth are molded using the injected PU. However, the woven fabric does not crosslink with the PU and has no other function. For the prior art of PU belts reference is made to the unexamined patent document WO 96/02584 A1 for example.

In a more recent development described in DE 10 2008 012 044.8, a self-supporting film (of PTFE for example) or a self-supporting film laminate (a PA-PTFE film laminate for example) is used instead of textile cover plies or in combination therewith, particularly under the aspect of rendering a drive belt oil resistant.

However, the research and development focus is on textile cover plies, and they also form the basis of the generic article, a drive belt in particular.

SUMMARY OF THE INVENTION

Against the background of the abovementioned problems with the use of a textile cover ply, the object of the present invention is to endow an article of the type mentioned at the beginning with a polymer-endowed textile cover ply that ensures a combination of permanent wear protection and noise insulation, particularly with regard to moisture-induced noises, coupled with simultaneously improved adherence of the textile cover ply to the foundational body.

This object is achieved when the polymer is an adhesion promoter, which is disposed between the foundational body and the textile cover ply, wherein the polymer is constituted such that it melts in the course of vulcanization and penetrates into the textile cover ply while undergoing co-crosslinking to become joined to a durable adhesive assembly formed by the foundational body and the textile cover ply.

The textile cover ply can be a woven fabric, a foamed-loop knit fabric, a drawn-loop knit fabric or a nonwoven fabric, in which case a woven fabric, a formed-loop knit fabric or a drawn-loop knit fabric is used in particular. These last three textile cover ply variants are elastic and useful for all article types: wherein the article is a band, belt, strap, hose, air spring lobe, compensator or multilayered web. In some applications, V-belts in particular, nonwoven fabrics can also be used as textile cover plies which are not very elastic. The textile cover ply comprises fibers, yarns or monofils. Advantageously, the textile cover ply consists wholly or partly of cotton and/or polyester and/or polyamide. When cotton is used, an untreated cotton will give the best results.

The adhesion promoter forms more particularly an adhesion-promoting layer, in which case there are in turn two variants in particular, as follows:

The adhesion-promoting layer is a self-supporting film formed of a compression-molded polymer in particular. The self-supporting film can be hot-pressed onto the textile cover ply prior to vulcanization. Alternatively, the self-supporting film can also be interleaved between the textile cover ply and the article blank prior to vulcanization.

The adhesion-promoting layer is a supported film formed from a polymeric solution in particular. In this case, the textile cover ply is brush-coated with a polymeric solution prior to the conversion of the article blank.

The adhesion-promoting layer is from 0.01 mm to 2 mm in thickness, more particularly from 0.01 to 1 mm in thickness and more particularly in turn from 0.02 to 0.1 mm in thickness.

The adhesion promoter is preferably a polyolefin, more particularly a polyethylene (PE) or polypropylene (PP). PE is of particular importance here.

Since the polymeric adhesion promoter can penetrate right up to the surface of the textile cover ply, particles can be additionally incorporated in the polymer, more particularly under the aspect of resistance to chemicals, oils and heat. These particles may consist of silicone and/or polyurethane and/or of a fluorinated polymer. Suitable fluorinated polymers include more particularly polyvinyl fluoride (PVF), polyvinylidene fluoride (PVDF) and polytetrafluoroethylene (PTFE). PTFE is of particular importance here.

The foundational body is usually a vulcanizate based on a vulcanized rubber mixture containing at least one rubber component and mixture ingredients. The rubber component used is in particular an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR), which are uncut or cut with at least one further rubber component, more particularly with one of the aforementioned types of rubber, for example in the form of an EPM-EPDM or SBR-BR blend. EPM or EPDM or an EPM-EPDM blend is of particular importance here. The aforementioned types of rubber are used in the case of drive belts in particular. The mixture ingredients comprise at least one crosslinker or crosslinker system (crosslinking agent and accelerator). Further mixture ingredients are usually additionally a filler and/or a processing aid and/or a plasticizer and/or an antioxidant and also, optionally, further added substances, for example fibers and color pigments. The general state of the rubber mixture arts is referenced in this regard.

The vulcanizate is more particularly crosslinked peroxidically, which is somewhat more particularly elucidated in connection with the rubber mixture of the abovementioned type. The customary vulcanization temperatures range from 130 to 200° C. The polymer used as adhesion promoter, PE for example, becomes partly mixed with the contacting rubber mixture, and is co-crosslinked by the peroxides, which produces a firm bond between the rubber mixture, the adhesion promoter and the textile cover ply.

The novel concept of adhesion finds particular application in the manufacture of a band, belt, strap, hose, air spring lobe (axial lobe, cross-laid lobe), compensator or multilayered web. Use of the novel concept of adhesion is outstandingly important in the manufacture of a drive belt which may be constructed as a flat belt, V-belt, V-ribbed belt, toothed belt, clutch belt or elevator belt. The particular emphasis in use is again on the V-belt, V-ribbed belt and toothed belt, which are hereinbelow more particularly presented in the course of exemplary embodiments.

In the case of drive belts, the force transmission zone and/or the top ply may be endowed with a textile cover ply, which is in turn additionally endowed with a polymer which is: (a) an adhesion promoter which is disposed between the foundational body and the textile cover ply, and wherein the polymer is constituted to melt in the course of vulcanization and to penetrate into the textile cover ply while undergoing co-crosslinking to become joined to a durable adhesive assembly formed by the foundational body and the textile cover ply; or (b) is constituted such that it melts in the course of vulcanization and in the process penetrates into the textile cover ply while undergoing co-crosslinking to become joined to a durable adhesive assembly formed by the foundational body and the textile cover ply.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
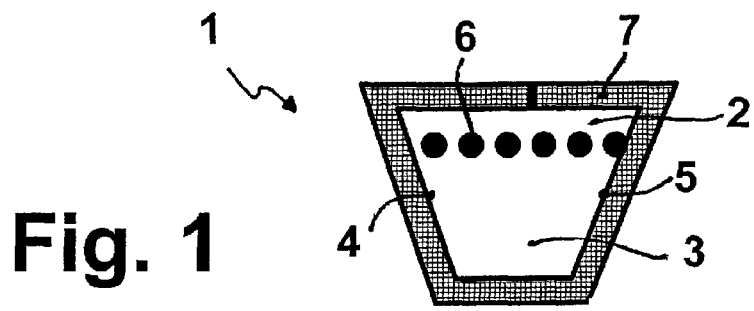
FIG. 1 shows a V-belt (cross section)

FIG. 1 shows a drive belt 1 configured as a V-belt. The foundational body based on a vulcanizate comprises a top ply 2 as belt backing, an embedded strength element ply having longitudinally extending tensile elements 6 in the form of individual cords, and also a substructure 3. The two V-shaped side flanks forming the force transmission zone 4 and 5 here extend from the top ply 2 into the substructure 3.

The textile cover ply 7 is a woven fabric, a formed-loop knit fabric, a drawn-loop knit fabric or a nonwoven fabric, more particularly based on untreated cotton, and embraces the force transmission zone 4 and 5 with complete ensheathing of the top ply 2 and the substructure 3 of the V-belt. Between the foundational body of the V-belt and the textile cover ply 7 there is disposed an adhesion promoter in the form of a polymer, the polymer being constituted such that it melts in the course of vulcanization and in the process penetrates into the textile cover ply while undergoing co-crosslinking to become joined to a durable adhesive assembly formed by the foundational body and the textile cover ply.

The adhesion promoter used as encompassing the entire textile cover ply 7 is more particularly a self-supporting film of a polyolefin, more particularly again a PE film or PP film, and this then leads to a modified textile cover ply in the course of the vulcanization. A PE-modified textile cover ply is of particular importance here.

Figure 2:
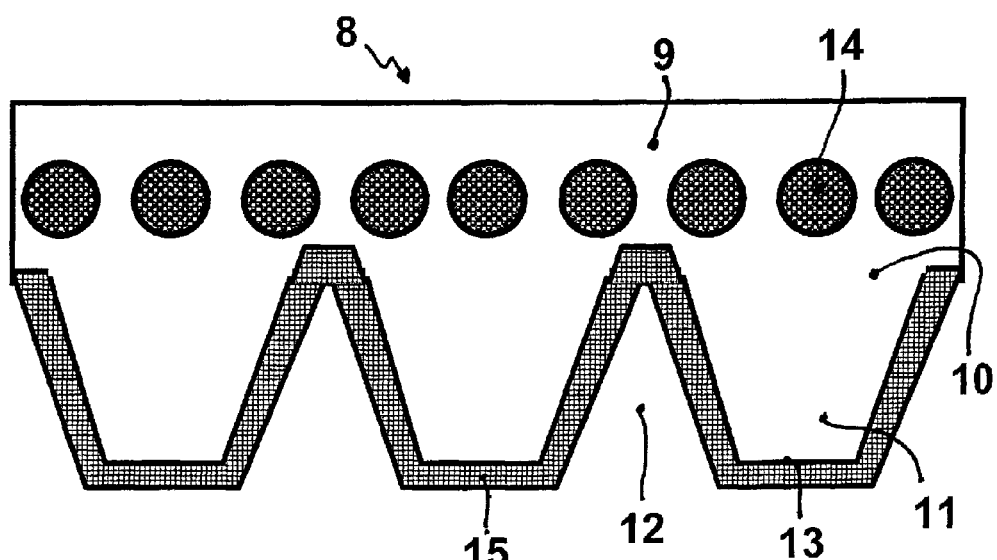
FIG. 2 shows a V-ribbed belt (cross section)

FIG. 2 shows a drive belt 8 configured as a V-ribbed belt having a top ply 9 as belt backing, a strength element ply comprising a longitudinally parallel arrangement of tensile elements 14 in the foam of individual cords, and also a substructure 10. The substructure has a V-ribbed structure formed from ribs 11 and grooves 12. This substructure comprises the force transmission zone 13.

The textile cover ply 15, which exclusively embraces the force transmission zone 13, consists of a woven fabric, a formed-loop knit fabric or a drawn-loop knit fabric, more particularly again based on untreated cotton. The adhesion promoter used is again preferably a self-supporting PE film, to form a PE-modified textile cover ply.

In connection with a V-ribbed belt (VRB), three different belts were investigated for their abrasion behavior, and the table which follows shows the parameters of the materials of construction and the abrasion:

| Belt | Textile cover ply | Self-supporting film | Abrasion after 48 h |
|---|---|---|---|
| VRB (a) of EPDM | Drawn-loop cotton knit | none | 1.70% |
| VRB (b) of EPDM | Drawn-loop cotton knit | PE (0.02 mm) | 0.87% |
| VRB (c) of EPDM | Drawn-loop cotton knit | PE (0.10 mm) | 0.82% |

The cotton was untreated in each case.

Abrasion was determined on a fired-up diesel engine of high non-uniformity at a speed of 800 min-1 via the weight change over run time. As is evident from the table, the two VRBs (b, c) with the modified PE textile cover ply are notable for distinctly improved abrasion behavior compared with VRB (a) without modified textile cover ply.

It was further observed in operation on a fired-up diesel engine that on addition of water the drawn-loop cotton knit fabric in the case of VRB (a) swells up after two minutes and is destroyed, whereas the two VRBs (b, c) show no signs of wear even after ten minutes under the same conditions. It was also observed that the adherence of the drawn-loop cotton knit is improved by the interleaved PE film.

Figure 3:
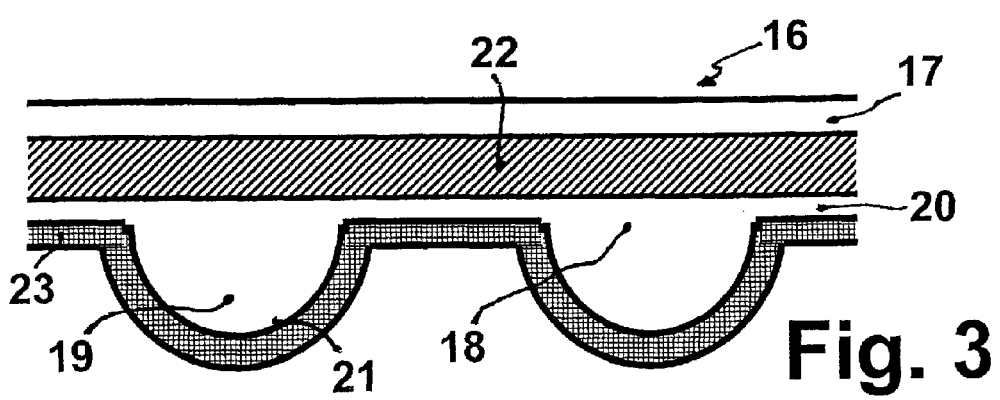
FIG. 3 shows a toothed belt (longitudinal section).

FIG. 3 finally shows a drive belt 16 which is configured as a toothed belt, with a top ply 17 as belt backing, a strength element ply comprising a parallel arrangement of longitudinal tensile elements 22 in the form of individual cords, and also with a substructure 18. The substructure is formed of teeth 19 and indentations 20 and comprises the force transmission zone 21.

The textile cover ply 23, which exclusively embraces the force transmission zone 21, consists of a woven fabric, a formed-loop knit fabric or a drawn-loop knit fabric, more particularly again based on untreated cotton. The adhesion promoter used is again preferably a self-supporting PE film, to form a PE-modified textile cover ply.

The tensile elements 6 (FIG. 1), 14 (FIG. 2) and 22 (FIG. 3) consist for example of steel, polyamide, aramid, polyester, glass fibers, carbon fibers, polyetheretherketone (PEEK) or polyethylene 2,6-naphthalate (PEN).

The top plies 9 (FIG. 2) and 17 (FIG. 3) can be free of a textile cover ply or likewise be endowed with a textile cover ply. This textile cover ply can then be PE-modified for example.

It is understood that the foregoing description is that of the preferred embodiments of the invention and that various changes and modifications may be made thereto without departing from the spirit and scope of the invention as defined in the appended claims.

LIST OF REFERENCE SYMBOLS
(Part of the description)

| | |
|---|---|
| 1 | drive belt (V-belt) |
| 2 | top ply (belt backing) |
| 3 | substructure |
| 4 | force transmission zone |
| 5 | force transmission zone |
| 6 | tensile elements in the form of individual cords |
| 7 | textile cover ply |
| 8 | drive belt (V-ribbed belt) |
| 9 | top ply (belt backing) |
| 10 | substructure |
| 11 | ribs |
| 12 | grooves |
| 13 | force transmission zone |
| 14 | tensile elements in the form of individual cords |
| 15 | textile cover ply |
| 16 | drive belt (toothed belt) |
| 17 | top ply (belt backing) |
| 18 | substructure |
| 19 | teeth |
| 20 | indentations |
| 21 | force transmission zone |
| 22 | tensile elements in the form of individual cords |
| 23 | textile cover ply |

What is claimed is:

1. An article having an elastic foundational body based on a vulcanizate having a wear-susceptible article surface, which is endowed with a textile cover ply, wherein in turn the textile cover ply is additionally at least partially endowed with a polymer, wherein the polymer is an adhesion promoter which is disposed between the foundational body and the textile cover ply, and wherein the polymer is constituted to melt in the course of vulcanization and to penetrate into the textile cover ply while undergoing co-crosslinking to become joined to a durable adhesive assembly formed by the foundational body and the textile cover ply, wherein the adhesion promoter is a polyolefin.

2. The article as claimed in claim 1, wherein the article is a band, belt, strap, hose, air spring lobe, compensator or multilayered web.

3. The article as claimed in claim 1, wherein the textile cover ply is a woven fabric, a formed-loop knit fabric, a drawn-loop knit fabric or a nonwoven fabric.

4. The article as claimed in claim 1, wherein the entire textile cover ply is endowed with the polymeric adhesion promoter.

5. An article having an elastic foundational body based on a vulcanizate having a wear-susceptible article surface, wherein the article is a drive belt, comprising a top ply as belt backing and a substructure with a force transmission zone, wherein at least the force transmission zone is endowed with a textile cover ply, wherein in turn at least the textile cover ply, which acts in the force transmission zone, is additionally endowed with a polymer, wherein the polymer is an adhesion promoter which is disposed between the foundational body and the textile cover ply, and wherein the polymer is constituted to melt in the course of vulcanization and to penetrate into the textile cover ply while undergoing co-crosslinking to become joined to a durable adhesive assembly formed by the foundational body and the textile cover ply, wherein the adhesion promoter is a polyolefin.

6. An article having an elastic foundational body based on a vulcanizate having a wear-susceptible article surface, wherein the article is a drive belt, comprising a top ply as belt backing and a substructure with a force transmission zone, wherein at least the top ply is endowed with a textile cover ply, wherein in turn at least the textile cover ply, which acts on the top ply, is additionally endowed with a polymer, wherein the polymer is an adhesion promoter, which is disposed between the foundational body and the textile cover ply, and wherein the polymer is constituted to melt in the course of vulcanization and to penetrate into the textile cover ply while undergoing co-crosslinking to become joined to a durable adhesive assembly formed by the foundational body and the textile cover ply, wherein the adhesion promoter is a polyolefin.

7. The article as claimed in claim 5, wherein the article is a V-belt.

8. The article as claimed in claim 7, wherein the textile cover ply of the V-belt is a woven fabric, a formed-loop knit fabric, a drawn-loop knit fabric or a nonwoven fabric.

9. The article as claimed in claim 7, wherein the textile cover ply embraces the top ply and the substructure with complete ensheathing of the V-belt.

10. The article as claimed in claim 9, wherein the entire textile cover ply is endowed with the polymeric adhesion promoter.

11. The article as claimed in claim 5, wherein the article is a V-ribbed belt.

12. The article as claimed in claim 5, wherein the article is a toothed belt.

13. The article as claimed in claim 11, wherein the textile cover ply of the V-ribbed belt is a woven fabric, a formed-loop knit fabric or a drawn-loop knit fabric.

14. The article as claimed in claim 1, wherein the adhesion promoter forms an adhesion-promoting layer.

15. The article as claimed in claim 14, wherein the adhesion-promoting layer is a self-supporting film.

16. The article as claimed in claim 15, wherein the self-supporting film is formed of a compression-molded polymer.

17. The article as claimed in claim 14, wherein the adhesion-promoting layer is a supported film.

18. The article as claimed in claim 17, wherein the supported film is formed from a polymeric solution.

19. The article as claimed in claim 14, wherein the adhesion-promoting layer is from 0.01 mm to 2 mm in thickness.

20. The article as claimed in claim 19, wherein the adhesion-promoting layer is from 0.01 mm to 1 mm in thickness.

21. The article as claimed in claim 19, wherein the adhesion-promoting layer is from 0.02 mm to 0.1 mm in thickness.

22. The article as claimed in claim 1, wherein the adhesion promoter is polyethylene (PE) or polypropylene (PP).

23. The article as claimed in claim 1, wherein the adhesion promoter additionally incorporates particles to increase resistance to chemicals, oils and/or heat.

24. The article as claimed in claim 23, wherein the particles consist of silicone and/or polyurethane (PU) and/or of a fluorinated polymer.

25. The article as claimed in claim 24, wherein the fluorinated polymer is polyvinyl fluoride (PVF) and/or polyvinylidene fluoride (PVDF) and/or polytetrafluoroethylene (PTFE).

26. The article as claimed in claim 1, wherein the textile cover ply comprises fibers, yarns or monofils.

27. The article as claimed in claim 1, wherein the textile cover ply consists wholly or partly of cotton and/or polyester and/or polyamide.

28. The article as claimed in claim 27, wherein the cotton is untreated.

29. The article as claimed in claim 1, wherein the elastic foundational body is a vulcanizate based on a vulcanized rubber mixture containing at least one rubber component and mixture ingredients.

30. The article as claimed in claim 29, wherein the rubber component is selected from the group consisting of an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR), which is used uncut or cut with at least one further rubber component.

31. The article as claimed in claim 30, wherein the rubber component is EPM or EPDM or an EPM-EPDM blend.

32. The article as claimed in claim 1, wherein the vulcanizate is crosslinked peroxidically.

33. The article as claimed in claim 30, wherein the at least one further component is selected from the group consisting of an ethylene-propylene copolymer (EPM), an ethylene-propylene-diene monomer copolymer (EPDM), (partly) hydrogenated nitrile rubber (HNBR), chloroprene rubber (CR), fluoro rubber (FKM), natural rubber (NR), styrene-butadiene rubber (SBR) or butadiene rubber (BR).

34. The article as claimed in claim 12, wherein the textile cover ply of the toothed belt is a woven fabric, a formed-loop knit fabric or a drawn-loop knit fabric.

* * * * *